United States Patent [19]
Lachampt et al.

[11] 3,846,546
[45] Nov. 5, 1974

[54] NEW EMULSIONS, AND COSMETIC PRODUCTS MADE FROM SUCH EMULSIONS

[75] Inventors: Felix Lachampt, Franconville; Andre Viout, Paris; Guy Vanlerberghe, Mitrymory, all of France

[73] Assignee: Societe Anonyme dite: L'Oreal, Paris, France

[22] Filed: July 13, 1971

[21] Appl. No.: 162,265

Related U.S. Application Data
[63] Continuation-in-part of Ser. No. 688,994, Dec. 8, 1967, abandoned.

[30] Foreign Application Priority Data
Dec. 8, 1966 Luxembourg .......................... 52534

[52] U.S. Cl. ............. 424/170, 424/365, 260/615 B, 252/365, 252/351, 252/309, 252/312
[51] Int. Cl...... A01n 9/04, A01n 17/10, A01n 9/00
[58] Field of Search ......... 424/170, 365; 260/615 B; 252/312, 309, 351

[56] References Cited
UNITED STATES PATENTS
1,970,578  8/1934  Schoeller et al. ..................... 260/98
3,344,100  9/1967  Donat et al. ........................ 260/23.7
3,382,285  5/1968  Egan et al. ...................... 260/615 B
3,485,762  12/1969  Gower et al. ........................ 252/152

FOREIGN PATENTS OR APPLICATIONS
538,070  3/1957  Canada .............................. 252/89

*Primary Examiner*—Albert T. Meyers
*Assistant Examiner*—Douglas W. Robinson
*Attorney, Agent, or Firm*—Cushman, Darby & Cushman

[57] ABSTRACT

Water-in-oil emulsions usefully employed in the preparation of cosmetics for the skin comprise a discontinuous aqueous internal phase, a continuous oil external phase, and as an emulsifying agent a compound having the formula $RO+C_2H_3O(R')\}_m\{C_2H_3O(CH_2OH)\}_n H$ wherein R is alkyl having 16–18 carbon atoms or the residue of hydrogenated lanolin alcohol, R' is methyl or ethyl, m is 3–5 and n is 2–3. The emulsion also contains a polymeric emulsion stabilization agent or a magnesium salt thereof, or magnesium isostearate.

11 Claims, No Drawings

NEW EMULSIONS, AND COSMETIC PRODUCTS MADE FROM SUCH EMULSIONS

This application is a continuation-in-part of our application Ser. No. 688,994, filed December 8, 1967, now abandoned.

It has long been considered advantageous to be able to produce cosmetics such as rouges and beauty creams in the form of "water-in-oil" emulsions, since it seems to have been established that the water retained in a dispersed state in the oily phase has a desirable moisturizing and protective effect on the skin.

However, it has heretofore been difficult to produce cosmetic products of this type commercially because "water-in-oil" emulsions have always had two disadvantages.

First, it is necessary that the water-in-oil emulsions do not reverse their phases, that is, that they do not transform themselves into emulsions of the "oil-in-water" type by aqueous dilution.

Secondly, it is necessary that the cosmetic products be in the form of emulsions which are sufficiently stable to maintain their finely dispersed structure, even though stored for as long as several years, and despite substantial changes in temperature which tend to promote breakdown of the emulsion as a consequence of loss of the aqueous phase from the dispersed state, which is particularly likely to happen when the emulsions are subjected to low temperatures.

The present invention relates to a new emulsion of the water-in-oil type which makes it possible to produce in an economical manner cosmetic compositions which are very stable when kept for a considerable length of time, and which can be subjected to temperatures substantially above and below room temperature without being adversely affected.

One object of the present invention is to provide a new article of manufacture which consists of a stable, irreversible emulsion of the water-in-oil type comprising a discontinuous aqueous internal phase, a continuous oil external phase, at least one emulsifying agent which is a compound having the formula:

$$R-O-[C_2H_3O(R')]_m-[C_2H_3O(CH_2OH)]_n-H \quad (I)$$

wherein

R is selected from the group consisting of alkyl having 16–18 carbon atoms and hydrogenated lanolin alcohol residue, R' is selected from the group consisting of $-CH_3$ and $-C_2H_5$, m is 3–5 and n is 2–3, and at least one emulsion stabilization agent selected from the group consisting of a. magnesium isostearate, b. an oil-soluble copolymer selected from the group consisting of:

i. a copolymer having the formula

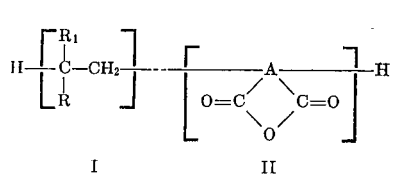

wherein A is selected from the group consisting of:

(1) 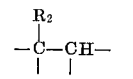

and (2) 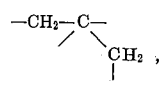

wherein $R_2$ is selected from the group consisting of hydrogen and methyl, and

R is selected from the group consisting of:

3. alkyl having 8–18 carbon atoms,

4. $-O-R_3$ wherein $R_3$ is alkyl having 16 carbon atoms, and

5. 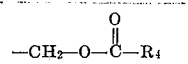

wherein $R_4$ is alkyl having 11–17 carbon atoms, with the proviso that when R is one of (3) and (4), $R_1$ is hydrogen and that when R is (5) $R_1$ is selected from the group consisting of hydrogen and methyl, the molar ratio of monomeric unit I:II is 1:1 and said copolymer has a molecular weight ranging between 4,000–100,000, ii. The magnesium salt of the copolymer of (i), (iii). a copolymer having the formula

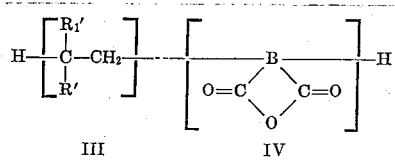

wherein B is

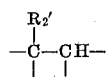

wherein $R_2'$ is selected from the group consisting of hydrogen and methyl,

R' is selected from the group consisting of

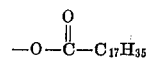

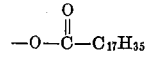

and

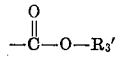

wherein $R_3'$ is alkyl having 12–18 carbon atoms with the proviso that when R' is one of (6) and (7), $R_1'$ is hydrogen and that when R' is (8) $R_1'$ is methyl, the molar ratio of monomeric unit III:IV ranges between 1–1.4:0.5–1 and said copolymer has a molecular weight ranging between 4,000–100,000, and iv. the magnesium salt of the copolymer of (iii), the amount of said emulsifying agent and emulsion stabilization agent in combination ranging between about 8.5–20 weight percent of said emulsion, said continuous external oil phase being present in amounts ranging between about 22–45 weight percent of said emulsion, the remainder comprising essentially said discontinuous aqueous external phase.

In the above water-in-oil emulsion, the emulsion stabilization agent is present in amounts ranging between about 0.5–8 weight percent of the emulsion.

The emulsifying agents as defined above can be prepared by polycondensation of an epoxide or a mixture of epoxides on a fatty alcohol in the presence of a catalyst of the Lewis acid type.

Magnesium isostearate can be obtained by double decomposition from isostearic acid such as that sold by the Emery Company.

The copolymers employed as emulsion stabilization agents can be prepared by copolymerizing an α-olefine having between about 10 and about 20 carbon atoms, such as 1-decene, 1-dodecene, 1-tetradecene, 1-hexadecene, 1-octadecene and 1-eicosene, or even acrylic esters and methaacrylic esters, having 15 to 22 carbon atoms, vinyl esters, allyl esters and methallyl esters having 15 to 22 carbon atoms, acrylamides and methacrylamides N-substituted by alkyls, said alkyls having 18 carbon atoms, and long chain alkyl-vinyl ethers.

Suitable dicarboxylic anhydrides for use in preparing these copolymers include maleic anhydride, itaconic anhydride, citraconic anhydride, acrylic anhydride, and methacrylic anhydride.

The copolymers can be prepared by polymerizing an unsaturated dicarboxylic acid anhydride with an unsaturated monomer having a lipophile chain in the presence of a catalyst such as benzoyl peroxide.

In order to prepare the magnesium salts of those copolymers the alkaline salt of the copolymer is first prepared, and this is reacted with a magnesium chloride solution.

Hydrogenated lanolin alcohols can be prepared as described by Stockdorn, E. Konig and Birk in the Tenside Review, 3, N°. 2 (1966) p. 45. Commercially such hydrogenated lanolin alcohols are available under the tradename "HYDROLAN" (melting point 48°–53°C) and "HYDROXOL" and "SUPER-SAT" (melting point 48°–50°C). Hydrogenated lanolin is practically odorless, tasteless and pale straw color.

It is known, for instance, that the lanolin alcohols comprise up to 30 carbon atoms and that they consist of a mixture of alcohols of the aliphatic series having straight or branched chains (iso and anteiso derivatives) and alcohols of alicyclic aclicycleic series (sterols and triterpenic alcohols) (in total about 33 different alcohols). The alcohols are found in lanolin essentially in the form of esters of fatty acids. Hydrogenation yields a mixture containing both alcohols from the unsaponifiable constituents and those from the fatty acids of lanolin. The fatty acids of lanolin are a complex mixture of about 36 different fatty acids.

In one embodiment of the water-in-oil emulsion of this invention, the emulsion stabilization agent is the oil-soluble copolymer, defined above, which is present in amounts ranging between 0–8 weight percent. However, when the oil-soluble copolymer, in this embodiment, is present in amounts less than 0.5 weight percent magnesium isostearate is used in amounts such that the minimum concentration of said emulsion stabilization agent is maintained.

In another embodiment of the water-in-oil emulsion of this invention, the emulsion stabilization agent is magnesium isostearate present in amounts ranging between 0–2.3 weight percent. However, when magnesium isostearate is present in amounts less than 0.5 weight percent, the oil-soluble copolymer, defined above, is present in amounts sufficient so that the minimum concentration of the emulsion stabilization agent is maintained.

Generally, the discontinuous internal aqueous phase is present in the water-in-oil emulsion of this invention in amounts ranging from about 40–60 weight percent of said emulsion, while the emulsifying agent is present in amounts of about 5–12 weight percent thereof.

Advantageously, it has been found that the continuous external oil phase comprises a mixture of oil and wax.

Representative useful oils employed in producing the water-in-oil emulsion include, for instance, petroleum jelly such as is sold under the trademark Vaseline, paraffin oil, purcellin, perhydrosqualene, lecithin, isopropyl palmitate, isopropyl myristate, cetyl ricinoleate, sweet almond oil, olive oil, ricin oil, turnsole oil, lanolin and 2-octyl dodecanol.

Representative waxes employed in producing the water-in-oil emulsion include, for instance, ozokerite, microcrystalline wax, bees wax, candelilla wax and carnauba wax.

Additionally, the water-in-oil emulsion of this invention can also include conventional adjuvants compatible with water-in-oil emulsions such as pigments, and titanium dioxide, in amounts ranging from about 0–5 weight percent of said emulsion.

The above water-in-oil emulsions can be prepared by heating a mixture containing said emulsifying agent, said emulsion stabilization agent and said oil phase to a temperature between about 60°–90°C and then pouring the aqueous phase which has been previously heated to essentially the same temperature, into said mixture while stirring vigorously. After this the emulsion is permitted to cool, while agitation is continued.

These water-in-oil emulsions which effectively penetrate the skin can advantageously be used to prepare such cosmetics as moisturizing lotions, cheek rouge, skin lotions, make-up bases and cuticle creams, and can, if desired, be packaged as a sprayable aerosol composition under pressure using conventional aerosol propellants such as dichlorodifluoromethane, trichloromonofluoromethane and their mixtures and applied to the skin as a foam.

Another object of the present invention is to provide a composition comprising a mixture of an oil phase with at least one first compound having the formula

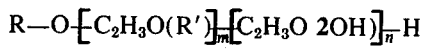

as defined above, and at least a second compound selected from the group consisting of compounds (a) and (b), also defined above, the amount of said first and second compounds, in combination, ranging between about 21.25–34.5 weight percent of said composition and said oil phase being present in amounts ranging between about 56.25–78.25 weight percent of said composition.

Preferably, the said compound is present in this composition in amounts ranging from about 1.25–15 weight percent thereof. In one embodiment of this composition when the second compound is said oil-soluble copolymer, as defined above, the same is present in amounts ranging between 0–15 weight percent of said composition. However, when the oil-soluble copolymer is present in amounts less than 1.25 weight percent, magnesium isostearate is present in amounts sufficient such that the minimum concentration of the second compound is maintained. In another embodiment, when the second compound is magnesium isostearate, the same is present in amounts ranging between 0–15 weight percent of the composition. However, when magnesium isostearate is present in amounts less than 1.25 weight percent, the oil-soluble copolymer is present in amounts sufficient such that the minimum concentration of the second compounds is maintained.

In this embodiment, the first compound is present in amounts ranging from about 10–24 weight percent of the compositions. Further the oil phase comprises preferably a mixture of oil and wax. Representative oils and waxes include those identified above. The composition can also include conventional cosmetic adjuvants compatible with water-in-oil emulsions such as described above.

These compositions which contain no aqueous phase can be usefully employed for instance as bath oils and skin protective lotions or can be employed to formulate water-in-oil emulsions as described above.

The following examples illustrate the present invention. Unless otherwise stated, all parts and percentages are by weight.

EXAMPLE 1

A moisturizing cream according to the invention is prepared by adding 60 g of water which has been heated to 90°C to the following mixture:

Compound having the formula:

$$RO\text{-}[C_2H_3O(CH_3)]_5[C_2H_3O(CH_2OH)]_2\text{-}H$$

| | |
|---|---|
| in which R represents stearyl | 8 g |
| Magnesium isostearate | 0.5 g |
| Petroleum jelly (Vaseline) | 10 g |
| Paraffin oil | 0.5 g |
| Isopropyl palmitate | 18 g |
| Lanolin | 1 g |
| Microcrystalline wax | 2 g |
| Perfume | 0.2 g |

This mixture is stirred vigorously and then cooled while the stirring is continued.

EXAMPLE 2

A moisturizing cream is prepared by adding 54 g of water which has first been heated to 90°C to the following mixture:

Compound having the formula:

$$RO\text{-}[C_2H_3O(CH_3)]_5[C_2H_3O(CH_2OH)]_2\text{-}H$$

| | |
|---|---|
| in which R represents stearyl | 9 g |
| Magnesium isostearate | 2.3 g |
| Magnesium salt of a 50% 1-octadecene/50% maleic anhydride copolymer (molar ratio) having a molecular weight of 18,000 | 3.25g |
| 50% 1-octadecene/50% maleic anhydride copolymer (molar ratio), molecular weight 18,000 | 1.3 g |
| Purcellin oil | 2 g |
| Isopropyl myristate | 12.4 g |
| Paraffin oil | 11.75g |
| Microcrystalline wax | 4 g |
| Perfume | 0.2 g |

This mixture is stirred vigorously and then cooled while still stirring.

EXAMPLE 3

A make-up base according to the invention is prepared by adding 60 g of water, which has been heated to 90°C to the following mixture:

Compound having the formula:

$$RO\text{-}[C_2H_3O(CH_3)]_5[C_2H_3O(CH_2OH)]_2\text{-}H$$

| | |
|---|---|
| in which R represents stearyl | 8 g |
| Magnesium isostearate | 2 g |
| 50% 1-octadecene/50% maleic anhydride copolymer (molar ratio), molecular weight- 18,000 | 2.8g |
| Petroleum jelly (Vaseline) | 9.3g |
| Paraffin oil | 7.2g |
| 2-octyl dodecanol | 3 g |
| Extract of lanolin alcohol sold under the trademark Amerchol L 101 (specific gravity 0.84-0.86 - viscosity 20-30 cps) | 0.2g |
| Pigments | 1.5g |
| Titanium oxide | 3 g |
| Natural white ozokerite wax | 3 g |
| Perfume | 0.2g |

This mixture is vigorously agitated, and then cooled while agitation is continued.

EXAMPLE 4

A cuticle cream according to the invention is prepared by adding 40 g of water which has been heated to 90°C to the following mixture:

Compound having the formula:

$$RO\text{-}[C_2H_3O(CH_3)]_4[C_2H_3O(CH_2OH)]_2\text{-}H$$

| | |
|---|---|
| in which R represents cetyl | 12 g |
| Magnesium salt of a 50% 1-octadecene/50% maleic anhydride copolymer (molar ratio), molecular weight - 18,000 | 5.5g |
| 50% 1-octadecene/50% maleic anhydride copolymer (molar ratio) molecular weight - 18,000 | 2.2g |
| Sweet almond oil | 4 g |
| Petroleum jelly (Vaseline) | 20 g |
| Lecithin | 2 g |
| Paraffin oil | 14.3g |

This mixture is vigorously stirred and then cooled while still stirring.

EXAMPLE 5

A bath oil according to the invention is prepared by dissolving at 130°C:

| | |
|---|---|
| Magnesium isostearate in: | 15g |
| Paraffin oil | 15 g |

When the temperature has fallen to 50°C a compound is introduced which has the following formula:

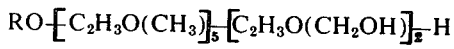

| in which R represents stearyl | 10 g |
| Perhydrosqualene | 60 g |
| Perfume | 0.2g |

This yields an oil which, when deposited on the surface of the bath water, is absorbed by the skin in an especially smooth and easy manner.

EXAMPLE 6

A moisturizing spray according to the invention is prepared by dissolving:

| Magnesium isostearate in: | 2.88 g |
| Paraffin oil heated to 130°C | 35.87 g |

When the temperature of the oil is reduced to 50°C a compound is added which has the formula:

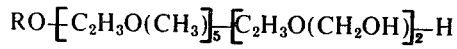

in which R represents stearyl 11.25 g mixed with 0,2 g of perfume.

The resulting oil is packaged under pressure in an aerosol bomb with 50 g of dichlorodifluoromethane.

When this spray is projected onto moistened skin, a water-in-oil emulsion according to the invention is extemporaneously produced.

EXAMPLE 7

A moisturizing milk is prepared by adding 47 g of water which has been heated to 90°C to the following mixture:

Compound responding to the formula:

| in which R represents stearyl | 7.8 g |
| Magnesium salt of 50% allyl stearate/50% itaconic anhydride copolymer (molar ratio) molecular weight - 30,000 | 7.8 g |
| Paraffin oil | 31 g |
| Microcrystalline wax | 6.4 g |

This is vigorously agitated and cooled while agitation is continued.

EXAMPLE 8

A fluid cream according to the invention is prepared by adding 50 g of water which has been heated to 90°C to the following mixture:

Compound according to the formula:

| in which R represents stearyl | 10 g |
| Magnesium salt of a 50% N-stearyl-acrylamide/50% citraconic anhydride copolymer (molar ratio), molecular weight - 48,000 | 5 g |
| Paraffin oil | 35 g |

This is vigorously agitated and cooled while agitation is continued.

EXAMPLE 9

A milk embodying the invention is prepared by adding 60 g of water which has been heated to 90°C to the following mixture:

Compound having the formula:

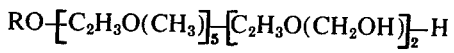

| in which R represents stearyl | 5 g |
| Magnesium salt of 50% cetylvinyl ether/50% maleic anhydride copolymer (molar ratio), molecular weight - 25,000 | 5 g |
| Paraffin oil | 30 g |

This mixture is vigorously agitated and cooled while agitation is continued.

EXAMPLE 10

A make-up base embodying the invention is prepared by adding 50 g of water which has been heated to 90°C to the following mixture:

Compound having the formula:

| R represents stearyl | 8 g |
| Magnesium salt of a 72% vinyl stearate/28% maleic anhydride copolymer (molar ratio), molecular weight - 45,000 | 4 g |
| Paraffin oil | 23.1g |
| Perhydrosqualene | 8.2g |
| Pigments | 1.5g |
| Titanium oxide | 2 g |
| Microcrystalline wax | 3 g |
| Perfume | 0.2g |

This mixture is vigorously agitated and cooled while agitation is continued.

EXAMPLE 11

An emulsion according to the invention is prepared by mixing the following ingredients:

| wherein R is stearyl | 9 g |
| Mg isostearate | 2 g |
| Magnesium salt of a 50% 1-octadecene 50% maleic anhydride copolymer (molar ratio), molecular weight 18,000 | 3 g |
| Isopropyl palmitate | 11.4g |
| Paraffin oil | 15.1g |
| Microcrystalline wax | 4.5g |
| Water | 55 g |

EXAMPLE 12

An emulsion according to the invention is prepared by mixing the following ingredients:

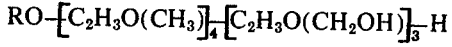

| wherein R is stearyl | 11 g |
| Paraffin oil | 15.5g |
| Petroleum jelly (Vaseline) | 15 g |
| Magnesium salt of a 50% 1-octadecene 50% maleic anhdyrride copolymer (molar ratio) - molecular weight - 18,000 | 4 g |
| Microcrystalline wax | 4.5g |
| Water | 50 g |

EXAMPLE 13

A moisturizing remover cream is prepared by adding to the following mixture 60 g of water which have been heated to 60°C:

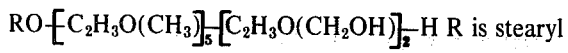 R is stearyl 6 g

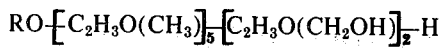

| | |
|---|---|
| R is hydrogenated lanolin alcohol residue | 3 g |
| Magnesium salt of a 50% 1-octadecene 50% maleic anhydride copolymer (molar ratio) - molecular weight - 18,000 | 3 g |
| Isopropyl palmitate | 11 g |
| Paraffin oil | 7 g |
| Purcellin oil | 6 g |
| Microcrystalline wax | 4 g |

EXAMPLE 14

An emulsion according to the present invention is prepared by adding to the following mixture 50 g of water which have been heated to 60°C:

| | |
|---|---|
| wherein R is stearyl | 10 g |
| Copolymer of 1-hexadecene/maleic anhydride (50:50% molar ratio), molecular weight - 97,000 | 3.5 g |
| Magnesium isostearate | 2 g |
| Olive oil | 5 g |
| Bees wax | 3 g |
| Paraffin oil | 26.5 g |

EXAMPLE 15

Another emulsion is prepared by adding to the following mixture 40 g of water heated to 60°C.

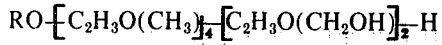

| | |
|---|---|
| wherein R is cetyl | 11 g |
| Copolymer of 1-decene/maleic anhydride (50:50% molar ratio), molecular weight - 18,000 | 4 g |
| Ricin oil | 5 g |
| Purcellin oil | 5 g |
| Candelilla wax | 4 g |
| Perhydrosqualene | 31 g |

EXAMPLE 16

Still another emulsion in accordance with the present invention is prepared as follows:

55 grams of water heated to a temperature of 60°C is combined with the following mixture also heated to 60°C:

| | |
|---|---|
| wherein R is a hydrogenated lanolin alcohol residue | 7 g |
| Magnesium salt of the copolymer of 1-octadecene/maleic anhydride (50:50% molar ratio), molecular weight - 4,000 | 3 g |
| Carnauba wax | 1.5 g |
| Cetyl ricinoleate | 1 g |
| Petroleum jelly (Vaseline) | 10 g |
| Turnsole oil | 5 g |
| Isopropyl myristate | 17.5 g |

EXAMPLE 17

A water-in-oil emulsion of this invention is prepared by adding 51.5 g of water heated to 90°C to the following mixture heated to about the same temperature:

| | |
|---|---|
| wherein R is stearyl | 9 g |
| Magnesium salt of the copolymer of maleic anhydride/dodecyl methacrylate (31:69% molar ratio), molecular weight - 40,000 | 3.5 g |
| Paraffin oil | 25 g |
| 2-octyl dodecanol | 7 g |
| Ozokerite | 4 g |

EXAMPLE 18

A water-in-oil emulsion is prepared by adding 60 g of water heated to 60°C to the following mixture:

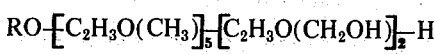

| | |
|---|---|
| wherein R is stearyl | 9.5 g |
| Magnesium salt of the copolymer of maleic anhydride/stearyl methacrylate (33:67% molar ratio), molecular weight - 55,000 | 2 g |
| Magnesium isostearate | 1.5 g |
| Perhydrosqualene | 10.5 g |
| Sweet almond oil | 3 g |
| Isopropyl palmitate | 10 g |
| Ozokerite | 3.5 g |

EXAMPLE 19

A water-in-oil emulsion in accordance with the present invention is prepared by adding 50 g of water heated to 90°C to the following mixture, also heated to about 90°C:

| | |
|---|---|
| wherein R is stearyl | 9 g |
| Magnesium salt of the copolymer of methallyl laurate/maleic anhydride (50:50% molar ratio), molecular weight - 24,000 | 4 g |
| Microcrystalline wax | 5 g |
| Paraffin oil | 32 g |

EXAMPLE 20

Another water-in-oil emulsion is prepared by adding 50 g of water heated to 60°C to the following mixture also heated to 60°C:

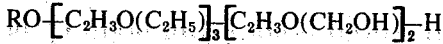

| | |
|---|---|
| wherein R is stearyl | 10 g |
| Copolymer of maleic anhydride/1-eicosene (50:50% molar ratio), molecular weight - 20,000 | 3.5 g |
| Magnesium isostearate | 2 g |
| Olive oil | 5 g |
| Bees wax | 3 g |
| Paraffin oil | 26.5 g |

The following examples illustrate water phasefree compositions usefully employed as bath oils and skin protective lotions.

EXAMPLE 21

A composition is prepared by mixing together:

| where R is stearyl | 20 g |
| --- | --- |
| Magnesium isostearate | 1.25g |
| Petroleum jelly | 25 g |
| Paraffin oil | 1.25g |
| Isopropyl palmitate | 45 g |
| Lanolin | 2 g |
| Microcrystalline wax | 5 g |
| Perfume | 0.5 g |

EXAMPLE 22

A composition suitably employed as a bath oil is prepared by mixing together the following ingredients:

| wherein R is stearyl | 19.6 g |
| --- | --- |
| Magnesium isostearate | 5 g |
| Magnesium salt of the copolymer of 1-octadecene/maleic anhydride (50:50% molar ratio), molecular weight - 18,000 | 7.1 g |
| Copolymer of 1-octadecene/maleic anhydride (50:50% molar ratio), molecular weight - 18,000 | 2.8 g |
| Purcellin oil | 4.3 g |
| Isopropyl myristate | 27 g |
| Paraffin oil | 25.4 g |
| Microcrystalline wax | 8.4 g |
| Perfume | 0.4 g |

EXAMPLE 23

Another composition is prepared by mixing the following ingredients:

| wherein R is stearyl | 20 g |
| --- | --- |
| Magnesium isostearate | 5 g |
| Copolymer of 1-octadecene/maleic anhydride (50:50% molar ratio), molecular weight - 18,000 | 7 g |
| Petroleum jelly (Vaseline) | 23 g |
| Paraffin oil | 18 g |
| 2-octyl dodecanol | 7.5 g |
| Extract of lanolin alcohol sold under the tradename Amerchol L 101 (sp. gr. 0.84-0.86; viscosity 20-30 cps) | 0.5g |
| Pigments | 3.75g |
| Titanium oxide | 7.5g |
| Natural white ozokerite wax | 7.25g |
| Perfume | 0.5g |

EXAMPLE 24

The following composition is prepared by admixing:

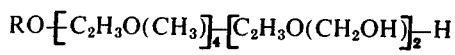

| wherein R is cetyl | 20 g |
| --- | --- |
| Magnesium salt of the copolymer of 1-octadecene/maleic anhydride (50:50% molar ratio), molecular weight - 18,000 | 9.2 g |
| Copolymer of 1-octadecene/maleic anhydride (50:50% molar ratio), molecular weight - 18,000 | 3.65 g |
| Sweet almond oil | 6.7 g |
| Petroleum jelly (Vaseline) | 33 g |
| Lecithin | 3.3 g |
| Paraffin oil | 29.15g |

EXAMPLE 25

A composition in accordance with the invention is prepared by mixing together the following ingredients:

RO-[C₂H₃O(CH₃)]₅[C₂H₃O(CH₂OH)]₂-H

| wherein R is stearyl | 14.75g |
| --- | --- |
| Magnesium salt of the copolymer of allyl stearate/itaconic anhydride (50:50% molar ratio), molecular weight- 30,000 | 14.75g |
| Paraffin oil | 58.5 g |
| Microcrystalline wax | 12 g |

EXAMPLE 26

A composition according to the invention is prepared by mixing together:

RO-[C₂H₃O(CH₃)]₅[C₂H₃O(CH₂OH)]₂-H

| wherein R is stearyl | 20 g |
| --- | --- |
| Magnesium salt of the copolymer of N-stearylacrylamide/citraconic anhydride (50:50% molar ratio), molecular weight - 48,000 | 10 g |
| Paraffin oil | 70 g |

EXAMPLE 27

The following composition is prepared in accordance with the invention by mixing together:

RO-[C₂H₃O(CH₃)]₅[C₂H₃O(CH₂OH)]₂-H

| wherein R is stearyl | 12.5 g |
| --- | --- |
| Magnesium salt of the copolymer of cetylvinyl ether/maleic anhydride (50:50% molar ratio), molecular weight - 25,000 | 12.5 g |
| Paraffin oil | 75 g |

EXAMPLE 28

The following composition is prepared by mixing together:

RO-[C₂H₃O(CH₃)]₅[C₂H₃O(CH₂OH)]₂-H

| wherein R is stearyl | 16 g |
| --- | --- |
| Magnesium salt of the copolymer of vinyl stearate/maleic anhydride (72:28% molar ratio), molecular weight - 45,000 | 8 g |
| Paraffin oil | 46.2g |
| Perhydrosqualene | 16.4g |
| Pigment | 3 g |
| Titanium oxide | 4 g |
| Microcrystalline wax | 6 g |
| Perfume | 0.4g |

EXAMPLE 29

A composition according to the invention is prepared by mixing together the following ingredients:

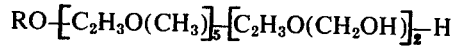

| wherein R is stearyl | 20 g |
| --- | --- |
| Magnesium isostearate | 4.35g |
| Magnesium salt of the copolymer of 1-octadecene/maleic anhydride (50:50% molar ratio), molecular weight | |

-Continued

| | |
|---|---|
| - 18,000 | 6.65g |
| Isopropyl palmitate | 25 g |
| Vaseline oil | 34 g |
| Microcrystalline wax | 10 g |

EXAMPLE 30

Another composition according to the invention is prepared by mixing together:

| | |
|---|---|
| wherein R is stearyl | 22 g |
| Paraffin oil | 30 g |
| Petroleum jelly (Vaseline) | 30 g |
| Magnesium salt of the copolymer of 1-octadecene/maleic anhydride (50:50% molar ratio), molecular weight - 18,000 | 8 g |
| Microcrystalline wax | 10 g |

EXAMPLE 31

A composition in accordance with the invention is prepared by admixing together:

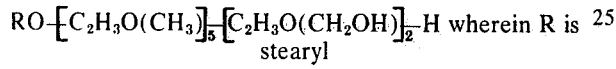 wherein R is stearyl 15 g

RO-[C₂H₃O(CH₃)]₅-[C₂H₃O(CH₂OH)]₂-H

| | |
|---|---|
| wherein R is hydrogenated lanolin alcohol residue | 7.5g |
| Magnesium salt of the copolymer of 1-octadecene/maleic anhydride (50:50% molar ratio), molecular weight - 18,000 | 7.5g |
| Isopropyl palmitate | 27.5g |
| Vaseline oil | 17.5g |
| Purcelin oil | 15 g |
| Microcrystalline wax | 10 g |

EXAMPLE 32

The following composition is prepared by mixing together:

RO-[C₂H₃O(C₂H₅)]₃-[C₂H₃O(CH₂OH)]₂-H

| | |
|---|---|
| wherein R is stearyl | 20 g |
| Copolymer of maleic anhydride/ 1-hexadecene (50:50% molar ratio), molecular weight - 97,000 | 7 g |
| Magnesium isostearate | 4 g |
| Olive oil | 10 g |
| Bees wax | 6 g |
| Paraffin oil | 53 g |

EXAMPLE 33

A composition in accordance with the invention is prepared as follows by admixing together:

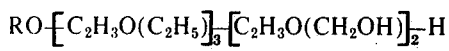

| | |
|---|---|
| wherein R is cetyl | 18.35 g |
| Copolymer of 1-decene/maleic anhydride (50:50% molar ratio), molecular weight - 18,000 | 6.65 g |
| Ricin oil | 8.5 g |
| Purcellin oil | 8.5 g |
| Candelilla wax | 6.65 g |
| Perhydrosqualene | 51.35 g |

EXAMPLE 34

The following composition is prepared by admixing together:

| | |
|---|---|
| wherein R is a hydrogenated lanolin alcohol residue | 15.5 g |
| Magnesium salt of the copolymer of 1-octadecene/maleic anhydride (50:50% molar ratio), molecular weight - 4,000 | 6.5 g |
| Carnauba wax | 3.25 g |
| Cetyl Ricinoleate | 2.25 g |
| Petroleum jelly (Vaseline) | 22.5 g |
| Turnsole oil | 12 g |
| Isopropyl myristate | 38 g |

EXAMPLE 35

A composition in accordance with the invention is prepared by mixing together the following ingredients:

| | |
|---|---|
| wherein R is stearyl | 24 g |
| Magnesium salt of the copolymer of maleic anhydride/stearyl methacrylate (33:67% molar ratio), molecular weight - 55,000 | 5 g |
| Magnesium isostearate | 3.75g |
| Perhydrosqualene | 26 g |
| Sweet almond oil | 7.5g |
| Isopropyl palmitate | 25 g |
| Ozokerite | 8.75g |

EXAMPLE 36

A composition according to the invention is prepared by admixing together:

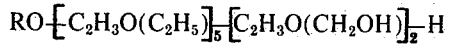

| | |
|---|---|
| wherein R is stearyl | 18.5 g |
| Magnesium salt of the copolymer of maleic anhydride/dodecyl methacrylate (31:69% molar ratio), molecular weight - 40,000 | 7.25g |
| Paraffin oil | 52 g |
| 2-octyl dodecanol | 14.25g |
| Ozokerite | 8 g |

EXAMPLE 37

Another composition in accordance with the invention is prepared by admixing together:

| | |
|---|---|
| wherein R is stearyl | 18 g |
| Magnesium salt of the copolymer of methallyl laurate/maleic anhydride (50:50% molar ratio), molecular weight - 24,000 | 8 g |
| Microcrystalline wax | 10 g |
| Paraffin oil | 64 g |

EXAMPLE 38

A composition according to the invention is prepared by admixing together the following ingredients:

| wherein R is stearyl | 20 g |
|---|---|
| Copolymer of maleic anhydride/1 eicosene (50:50% molar ratio), molecular weight - 20,000 | 7 g |
| Magnesium isostearate | 4 g |
| Olive oil | 10 g |
| Bees wax | 6 g |
| Paraffin oil | 53 g |

In the above examples the microcrystalline wax employed can have a minimum kinematic viscosity of 5.75 centistokes at 210°F and a maximum penetration of 60 at 77°F determined by ASTM method D5-25. Such waxes can have a melting point in range of about 110°F to 200°F.

What is claimed is:

1. A cosmetic water-in-oil emulsion, which effectively penetrates the skin, consisting essentially of water, oil, and an emulsifying agent having the formula $$RO\text{---}[C_2H_3O(R')]_m[C_2H_3O(CH_2OH)]_n\text{---}H$$

wherein R is selected from the group consisting of alkyl having 16-18 carbon atoms and hydrogenated lanolin alcohol residue, R' is selected from the group consisting of $-CH_3$ and $-C_2H_5$, $m$ is 3-5 and $n$ is 2-3, and an emulsion stabilization agent selected from the group consisting of a. magnesium isostearate, b. an oil-soluble copolymer selected from the group consisting of i. a copolymer having the formula $$H\text{---}\begin{bmatrix}R_1\\|\\C\text{---}CH_2\\|\\R\end{bmatrix}\text{---}\begin{bmatrix}\text{---}A\text{---}\\O=C\diagdown\diagup C=O\\O\end{bmatrix}\text{---}H$$

I  II wherein A is selected from the group consisting of (1)

$$\begin{array}{c}R_2\\|\\-C\text{---}CH\text{---}\\|\quad |\end{array}$$

and (2)

$$-CH_2\text{---}C\diagdown\diagup CH_2\,,$$

where $R_2$ is selected from the group consisting of hydrogen and methyl, and

R is selected from the group consisting of 3. alkyl having 8-18 carbon atoms,

4. $-O-R_3$ wherein $R_3$ is alkyl having 16 carbon atoms and

5.

$$\begin{array}{c}O\\||\\-CH_2\text{---}O\text{---}C\text{---}R_4\end{array}$$

wherein $R_4$ is alkyl having 11-17 carbon atoms, with the proviso that when R is one of (3) and (4), $R_1$ is hydrogen and that when R is (5), $R_1$ is selected from the group consisting of hydrogen and methyl, the molar ratio of monomeric units I:II is 1:1 and said copolymer has a molecular weight ranging between 4,000 - 100,000, ii. the magnesium salt of the copolymer of (i), iii. a copolymer having the formula $$H\text{---}\begin{bmatrix}R_1'\\|\\C\text{---}CH_2\\|\\R'\end{bmatrix}\text{---}\begin{bmatrix}\text{---}B\text{---}\\O=C\diagdown\diagup C=O\\O\end{bmatrix}\text{---}H$$

III  IV wherein B is $$\begin{array}{c}R_2'\\|\\-C\text{---}CH\text{---}\\|\quad |\end{array}$$

wherein $R'_2$ is selected from the group consisting of hydrogen and methyl, and R' is selected from the group consisting of

6.

$$\begin{array}{c}O\\||\\-O\text{---}C\text{---}C_{17}H_{35},\end{array}$$

7.

$$\begin{array}{c}O\\||\\-C\text{---}NH\text{---}C_{18}H_{37}\end{array}$$

and

8.

$$\begin{array}{c}O\\||\\-C\text{---}O\text{---}R_3'\end{array}$$

wherein $R'_3$ is alkyl having 12-18 carbon atoms, with the proviso that when R' is one of (6) and (7), $R'_1$ is hydrogen and that when R' is (8), $R'_1$ is methyl, the molar ratio of monomeric units III:IV ranges between 1-1.4:0.5-1 and said copolymer has a molecular weight ranging between 4,000-100,000 and iv. the magnesium salt of the copolymer of (iii), and c. a mixture of (a) and (b), the amount of said emulsifying agent and emulsion stabilization agent in combination ranging between 8.5-20 weight percent of said composition, said oil being present in amounts ranging between about 22-45 weight percent of said composition, the remainder comprising essentially water.

2. The cosmetic water-in-oil emulsion of claim 1 wherein said emulsion stabilization agent is present in amounts ranging between about 0.5-8 weight percent of said composition.

3. The cosmetic water-in-oil emulsion of claim 1 wherein said discontinuous internal aqueous phase is present in amounts ranging from about 40-60 weight percent of said composition.

4. The cosmetic water-in-oil emulsion of claim 1 wherein said emulsifying agent is present in amounts ranging from about 5-12 weight percent of said composition.

5. The water-in-oil emulsion of claim 1 wherein said oil is selected from the group consisting of petroleum jelly, paraffin oil, purcellin, perhydrosqualene, lecithin, isopropyl palmitate, isopropyl myristate, cetyl ricinoleate, sweet almond oil, olive oil, ricin oil, turnsole oil, lanolin and 2-octyl dodecanol.

6. The water-in-oil emulsion of claim 1 which also includes a wax selected from the group consisting of ozokerite, microcrystalline wax, beeswax, candelilla wax and carnauba wax.

7. A cosmetic composition in the form of a bath oil or skin protective lotion comprising a mixture of an oil with at least a first compound having the formula

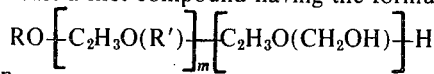

wherein
R is selected from the group consisting of alkyl having 16-18 carbon atoms and hydrogenated lanolin alcohol residue,
R' is selected from the group consisting of —$CH_3$ and —$C_2H_5$,
$m$ is 3-5 and
$n$ is 2-3, and at least one of a second compound selected from the group consisting of
a. magnesium isostearate,
b. an oil-soluble copolymer selected from the group consisting of
i. a copolymer having the formula

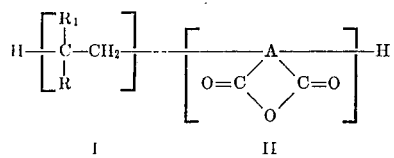

wherein A is selected from the group consisting of (1) 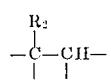

and (2) 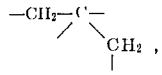

where $R_2$ is selected from the group consisting of hydrogen and methyl, and
R is selected from the group consisting of
3. alkyl having 8-18 carbon atoms,
4. —O—$R_3$ wherein $R_3$ is alkyl having 16 carbon atoms and
5.

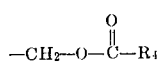

wherein $R_4$ is alkyl having 11-17 carbon atoms,
with the proviso that when R is one of (3) and (4), $R_1$ is hydrogen and that when R is (5), $R_1$ is selected from the group consisting of hydrogen and methyl, the molar ratio of monomeric units I:II is 1:1 and said copolymer has a molecular weight ranging between 4,000 — 100,000,
ii. the magnesium salt of the copolymer of (i),
iii. a copolymer having the formula

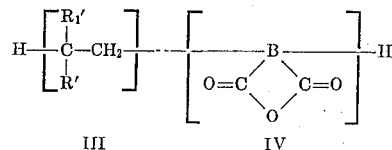

wherein B is

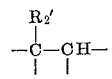

wherein $R'_2$ is selected from the group consisting of hydrogen and methyl, and
R' is selected from the group consisting of
6.

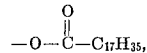

7.

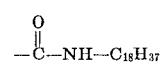

and

8.

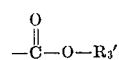

wherein $R'_3$ is alkyl having 12-18 carbon atoms,
with the proviso that when R' is one of (6) and (7), $R'_1$ is hydrogen and that when R' is (8), $R'_1$ is methyl, the molar ratio of monomeric units III:IV ranges between 1-1.4:0.5-1 and said copolymer has a molecular weight ranging between 4,000-100,000 and
iv. the magnesium salt of the copolymer of (iii), and
c. a mixture of (a) and (b), the amount of said first and second compounds, in combination, ranging between about 21.25-34.5 weight percent of said composition and said oil being present in amounts ranging between about 56.25-78.25 weight percent of said composition.

8. The composition of claim 7 wherein said second compound is present in amounts ranging between 1.25-15 weight percent of said composition.

9. The composition of claim 7 wherein said first compound is present in amounts ranging from about 10-24 weight percent of said composition.

10. The composition of claim 7 wherein said oil is selected from the group consisting of petroleum jelly, paraffin oil, purcellin, perhydrosqualene, lecithin, isopropyl palmitate, isopropyl myristate, cetyl ricinoleate, sweet almond oil, olive oil, ricin oil, turnsole oil, lanolin and 2-octyl dodecanol.

11. The composition of claim 7 which also includes a wax selected from the group consisting of ozokerite, microcrystalline wax, bees wax, candelilla wax and carnauba wax.

* * * * *